United States Patent
Keiser et al.

(10) Patent No.: US 7,487,123 B1
(45) Date of Patent: Feb. 3, 2009

(54) COMPUTER-IMPLEMENTED SECURITIES TRADING SYSTEM WITH VIRTUAL CURRENCY AND VIRTUAL SPECIALIST

(75) Inventors: Timothy M. Keiser, Los Angeles, CA (US); Michael R. Burns, Los Angeles, CA (US)

(73) Assignee: CFPH, LLC, New York, NY (US)

( * ) Notice: Subject to any disclaimer, the term of this patent is extended or adjusted under 35 U.S.C. 154(b) by 1771 days.

(21) Appl. No.: 09/382,907

(22) Filed: Aug. 25, 1999

Related U.S. Application Data

(63) Continuation-in-part of application No. 09/184,571, filed on Nov. 2, 1998, now Pat. No. 6,505,174, which is a continuation-in-part of application No. 08/620,906, filed on Mar. 25, 1996, now Pat. No. 5,950,176.

(51) Int. Cl.
*G06Q 99/00* (2006.01)

(52) U.S. Cl. .................. 705/37; 705/35; 705/36 R; 705/1

(58) Field of Classification Search .............. 705/37, 705/35, 36, 1, 36 R
See application file for complete search history.

(56) References Cited

U.S. PATENT DOCUMENTS

| | | | |
|---|---|---|---|
| 3,499,646 A | 3/1970 | Burgess, Jr. et al. ............ 273/1 |
| 3,573,747 A | 4/1971 | Adams et al. ............ 340/172.5 |
| 3,581,072 A * | 5/1971 | Nymeyer ...................... 705/37 |
| 4,412,287 A * | 10/1983 | Braddock, III ................ 705/37 |
| 4,597,046 A | 6/1986 | Musmanno et al. ......... 364/408 |
| 4,674,044 A * | 6/1987 | Kalmus et al. ................ 705/37 |
| 4,823,265 A * | 4/1989 | Nelson .......................... 705/35 |
| 4,903,201 A | 2/1990 | Wagner ....................... 364/408 |
| 4,980,826 A | 12/1990 | Wagner ....................... 364/408 |
| 5,077,665 A | 12/1991 | Silverman et al. ............. 705/37 |
| 5,101,353 A * | 3/1992 | Lupien et al. ................. 705/37 |
| 5,136,501 A * | 8/1992 | Silverman et al. ............. 705/37 |
| 5,237,500 A * | 8/1993 | Perg et al. ..................... 705/35 |

(Continued)

FOREIGN PATENT DOCUMENTS

DE 3539545 A1 7/1986

(Continued)

OTHER PUBLICATIONS

Hakansson, Nils H. et al. "On the feasibility of automated market making by a programmed specialist," Journal of Finance, vol. XL, No. 1. pp. 1-20, Mar. 1985.*

(Continued)

*Primary Examiner*—Akiba K Robinson Boyce
(74) *Attorney, Agent, or Firm*—Antonio Papageorgiou

(57) ABSTRACT

A computer-implemented financial management system provides the trading of securities via a network using virtual currency. A server computer receives buy and sell orders for derivative financial instruments from a plurality of client computers. The server computer attempts to match the buy and sell orders and then generates a market price through the use of a virtual specialist program executed by the server computer. The virtual specialist program responds to an imbalance in the matching of the buy and sell orders. The virtual currency accumulated by HSX account holders as a result of successful trading may be converted to another currency, credited toward the cost of merchandise provided through a vendor's web site, etc.

15 Claims, 8 Drawing Sheets

U.S. PATENT DOCUMENTS

| | | | | |
|---|---|---|---|---|
| 5,270,922 | A | | 12/1993 | Higgins ...................... 364/408 |
| 5,297,032 | A | | 3/1994 | Trojan et al. ................ 364/408 |
| 5,375,055 | A | | 12/1994 | Togher et al. ............... 364/408 |
| 5,497,317 | A | * | 3/1996 | Hawkins et al. ............... 705/37 |
| 5,508,731 | A | | 4/1996 | Kohorn .......................... 707/1 |
| 5,508,913 | A | | 4/1996 | Yamamoto et al. .......... 364/408 |
| 5,537,314 | A | | 7/1996 | Kanter ....................... 364/406 |
| 5,557,517 | A | * | 9/1996 | Daughterty, III ............. 705/37 |
| 5,689,652 | A | * | 11/1997 | Lupien et al. ................. 705/37 |
| 5,692,233 | A | | 11/1997 | Garman ........................ 705/36 |
| 5,724,524 | A | | 3/1998 | Hunt et al. .................. 395/237 |
| 5,727,165 | A | | 3/1998 | Ordish et al. ............... 395/237 |
| 5,819,237 | A | | 10/1998 | Garman ........................ 725/24 |
| 5,819,238 | A | * | 10/1998 | Fernholz ....................... 705/36 |
| 5,826,241 | A | * | 10/1998 | Stein et al. ..................... 705/26 |
| 5,845,266 | A | * | 12/1998 | Lupien et al. ................. 705/37 |
| 5,905,974 | A | | 5/1999 | Fraser et al. ................... 705/37 |
| 5,913,203 | A | * | 6/1999 | Wong et al. .................... 705/39 |
| 5,924,082 | A | | 7/1999 | Silverman et al. ............. 705/37 |
| 5,950,176 | A | * | 9/1999 | Keiser et al. .................. 705/37 |
| 5,950,177 | A | * | 9/1999 | Lupien et al. ................. 705/37 |
| 6,012,046 | A | * | 1/2000 | Lupien et al. ................. 705/37 |
| 6,014,643 | A | | 1/2000 | Minton ......................... 705/37 |
| 6,016,483 | A | * | 1/2000 | Rickard et al. ................ 705/37 |
| 6,026,388 | A | | 2/2000 | Liddy et al. ............... 705/36 R |
| 6,029,146 | A | * | 2/2000 | Hawkins et al. ............... 705/35 |
| 6,263,321 | B1 | | 7/2001 | Daughtery, III .............. 705/36 |
| 6,578,010 | B1 | | 6/2003 | Teacherson .................. 705/14 |

FOREIGN PATENT DOCUMENTS

| | | | |
|---|---|---|---|
| WO | WO 93/10503 | * | 5/1993 |
| WO | WO 96/41315 | * | 12/1996 |
| WO | WO98/58333 A1 | | 12/1998 |
| WO | WO01/16825 A1 | | 3/2001 |
| WO | WO01/39056 A1 | | 5/2001 |

OTHER PUBLICATIONS

Freund, William C. "Trading stock around the clock: the future growth of global electronic markets", California Management Review, v. 34, n1, pp. 87, 1991.*

Bloomfield, Robert, "The interdependence of reporting discretion and informational efficiency in laboratory markets", the accounting Review, v. 71, pp. 493-511, Oct. 1996.*

Lindsey, Richard R. and Ulrike Schaede, "Specialist vs. Saitori: market-making in New York and Tokyo", Financial analysts Journal, v. 48, n.4, pp. 48-57, Jul. 1992.*

Chan, K.C. et al., "Market structure and the intraday pattern of bid-ask spreads for NASDAQ securities", the Journal of Business, v. 68, n. 1, p. 35, Jan. 1995.*

Howard, Barbara, "The trade: technology aims to take the final step", Institutional Investor, v.25, n.1, p. S15, Jan. 1991.*

Michael Schrage, "Firms Quietly Forming Own Economies", San Jose mercury news, Jul. 1992.*

Nash, Kim S., "Cybercash at risk: Money laws lacking", Computerworld, Dec. 1996.*

"Digital Commerce on Increase", Publishing Technology Review, v2, n2, Jan. 1995.*

Peter H. Lewis, "Attention Internet Shoppers: E-Cash Is Here", The New York Times, Section D, p. 4, col. 4, Oct. 1994.*

Saul Hansell, "Today, Shoppers on Internet Get Access to Electronic Cash", The New York Times, Section d, p. 4, col. 5, Oct. 1995.*

Domowitz-I et al., "Auctions as algorithms: computerized trade execution and price discovery", Journal of Economic Dynamics and Control, {J-Econ-Dyn-Control-Netherlands}, Jan. 1994, vol. 18, No. 1, p. 29-60.*

Tuchlin; Smooth Negotiating: Making the Director Deal. 1998 The Internet printout.

Amex.com, The Street.com, Across the Street: Buying Stock in Hollywood, Jeffrey L. Newman, Nov. 17, 1997, 2 pgs.

Cones: 43 Ways to Finance Your Feature Film. 1995. pp. 47 and 45.

Cones, John W. and Wilke, Pete, "Investor Financing of Independent Film", 1998.

Engineers, Hollywood Stock Exchange, printed on Nov. 13, 1997, 2 pgs.

Jack Feuer: Disc Driven. Findarticles.com; Jul. 12, 1999.

Insider Trading—Hollywood Style, Entrepreneurial Edge Online, OnlinePress.com, Matthew Ragas, Feb. 4, 1998, 3 pgs.

The Internet Bull Market in Movies, Newsweek, Yahlin Chang, Feb. 3, 1997, pp. 3.

Lights, Camera, Capital On-line Investing, Debra Kaufman, Wired Magazine, May 2001, 1 sheet.

MediaX and CMC International Records Team Up for Exclusive Download Campaigns with Major Artists. PR Newswire, Dec. 9, 1999.

" A New Craze for March's Maddest: Online 'Trading' of NCAA Shares", Barbara Martinez, The New York Times Company: Abstracts, Mar. 8, 1994.

The New York Times, The Hollywood Stock Market: You Can't Lose, Laura Pedersen-Pietersen, Jan. 11, 1998, 3 pgs.

The Rogue Market Journal, The Power Play on Popular Culture, A Letter from the Editor, print on Dec. 31, 1996, 18 pgs.

SunSpot Maryland's Online Community, Taking Stock at the Box Office, Alex Dubin, printed on Aug. 19, 1997, 5 pgs.

Ventura County Review; The Los Angeles Times; Dec. 15, 1998.

Ye, Jia, "An Investigation of Market Fragmentation and the Specialist's Quotation Strategy (Information Risk, Liquidity, Bid Ask Spread", 1995, vol. 57/03-A of Dissertation Abstracts International, p. 1260, 97 pgs.

American Film Market; Hollywoodnet.com; 1997, http://www.hollywoodnet.com/conferences/afm97.htm.

Astral Media The Harold Greenberg Fund's Equity Investment Program; 1992, ttp://www.tmn.ca/hgfund/pdf/fundEquityJune2002.pdf.

Avary's Domain—Interviews—Multimeter Magazine Interview, Mar. 3, 1994; pp. 9-10, http://www.avary.com/killingzoe/details/interview.kz.millimetermag.html.

Canadians turn to co-finance, pre-sales for TV prod'n coin. Findarticles.com, Jan. 19, 1998, http://www.findarticles.com/cf_0/m1312/n10_v369/20371093/print.jhtml.

Film Finances, Inc. The World Leader in Completion Guarantees. Oct. 1999 Internet print-out.

Film Finances, Inc. The World Leader in Completion Guarantees. Sample Completion Guaranty; Aug. 2000 Internet print-out.

* cited by examiner

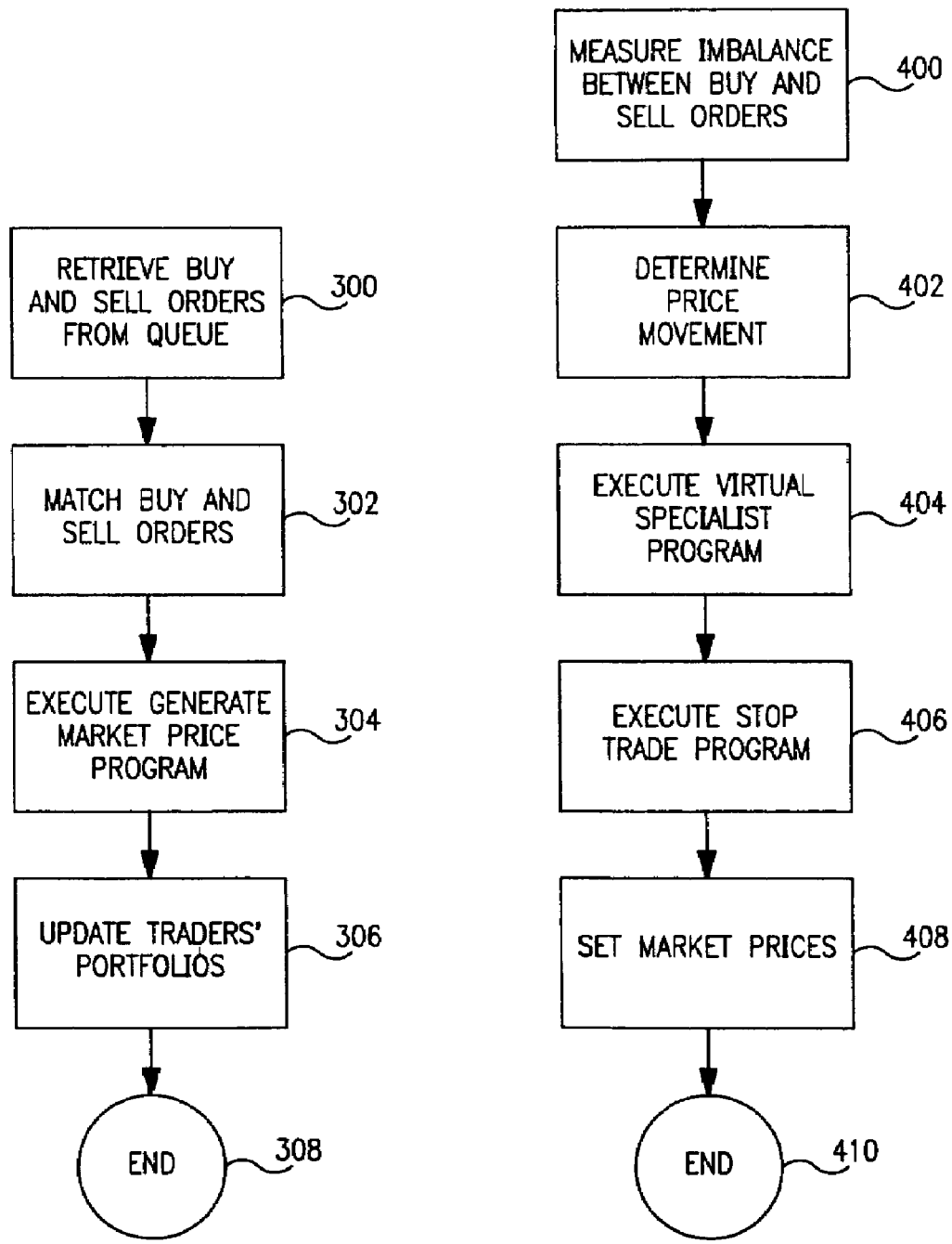

COMPUTER-IMPLEMENTED SECURITIES TRADING SYSTEM WITH VIRTUAL CURRENCY AND VIRTUAL SPECIALIST

This application is a continuation-in-part of U.S. application Ser. No. 09/184,571, filed Nov. 2, 1998 now U.S. Pat. No. 6,505,174 which is a continuation-in-part of U.S. application Ser. No. 08/620,906, filed Mar. 25, 1996 now U.S. Pat. No. 5,950,176.

COPYRIGHT NOTICE

A portion of the disclosure of this patent document contains material which is subject to copyright protection. The copyright owner has no objection to the facsimile reproduction by anyone of the patent document or of the patent disclosure as it appears in the Patent and Trademark Office patent files or records, but otherwise reserves all copyright rights whatsoever.

BACKGROUND OF THE INVENTION

This invention relates in general to computer-implemented financial systems, and in particular to an improved automated securities trading system.

Computer-implemented securities trading systems are well known in the art. One such system is that disclosed in U.S. Pat. No. 4,674,044, issued to Kalmus et al., entitled "Automated Securities Trading System", and incorporated by reference herein. These computer-implemented securities trading systems obtain bid and asked trades based on the bid and asked prices. However, there is generally still a human component to such systems.

For example, most financial markets also employ one or more market makers called "specialists." These specialists fill customer orders from the specialist's inventory position if there are no matches for the customer orders in the open market. In the prior art, the specialist function is not automated, but is performed by a firm or individual. Thus there is a need in the art for an improved computer-implemented trading system that includes an automated specialist function to create a market for the securities traded and to lessen the volatility of smaller securities markets.

BRIEF SUMMARY OF THE INVENTION

The above need is met by a method for trading instruments in a computerized trading system that receives buy orders and sell orders for an instrument. According to the present invention, an imbalance between the buy orders and sell orders is measured for the instrument received over a given period. Based on the measured imbalance between the number of buy and sell orders, a projected price movement is computed. A market price for the instrument is then set based upon the received buy and sell orders and the measured imbalance. To guarantee execution of some or all of the received buy or sell orders, additional buy orders or sell orders for the instrument are automatically generated at the market price. An electronic currency is generated to execute the buy and sell orders such that a first trader's account is credited with proceeds in the electronic currency for the executed sell orders by the first trader and a second trader's account is debited in the electronic currency for the executed buy orders by the second trader.

In accordance with one aspect of the present invention, the electronic currency is Hollywood dollars. The Hollywood dollars in the first or second trader's account may be exchanged for desired currency.

In accordance with another aspect of the present invention, goods or services are purchased using the Hollywood dollars in the first or second trader's account. The goods or services are offered for sale by an on-line vendor via a web site on the Internet.

BRIEF DESCRIPTION OF THE DRAWINGS

Referring now to the drawings in which like reference numbers represent corresponding parts throughout:

FIG. 3 shows a flowchart illustrating the logic of the pricing/trading program of the first embodiment of the present invention;

FIG. 4 shows a flowchart illustrating the logic of the generate market price program of the first embodiment of the present invention;

DETAILED DESCRIPTION OF THE PREFERRED EMBODIMENTS

Figure 1:
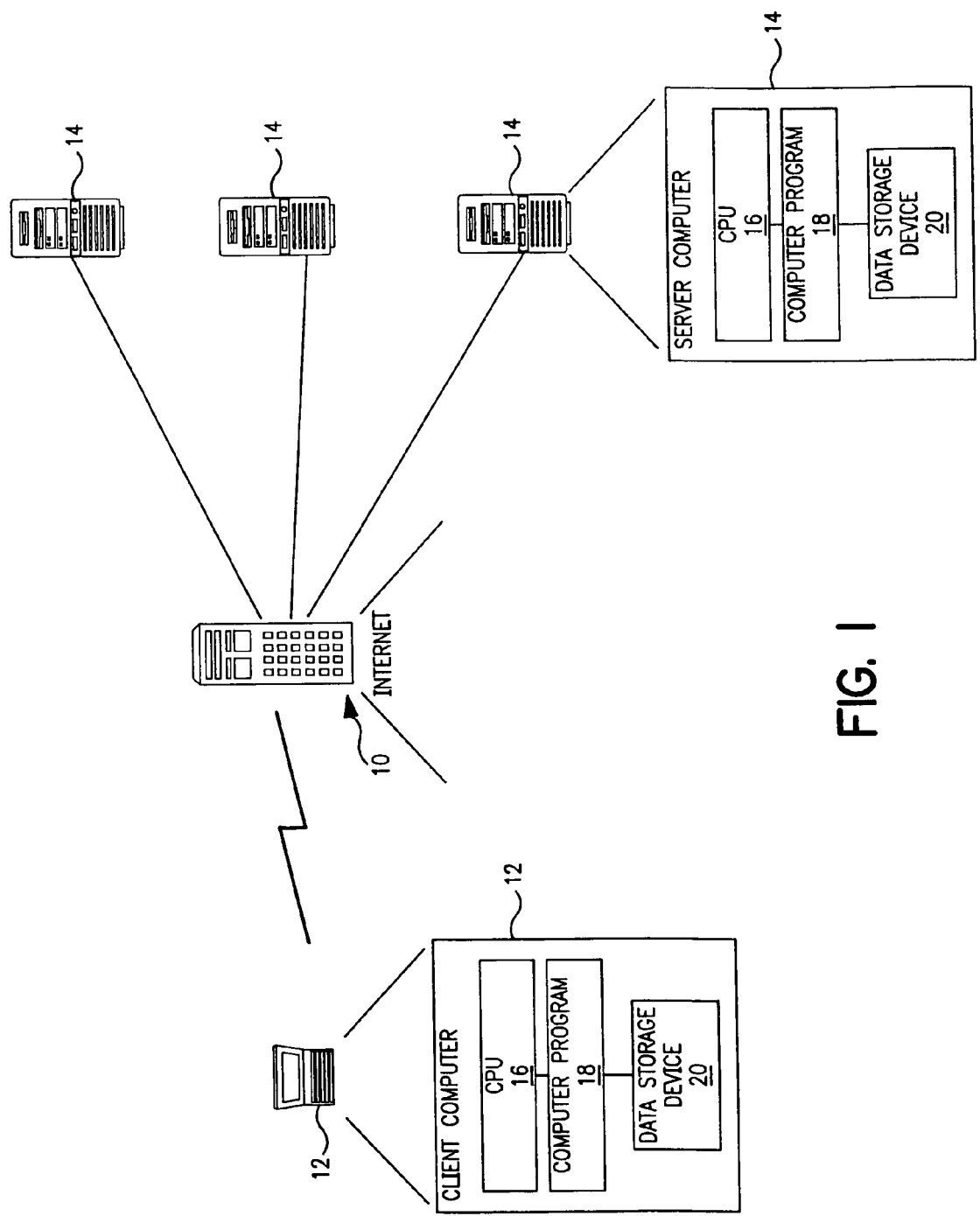
FIG. 1 shows a block diagram of an exemplary hardware environment of the present invention.

According to the present invention, a computer-implemented trading system is provided for derivative financial instruments. The computer-implemented trading system accepts buy and sell orders from traders for the derivative financial instruments, sets a market price based on the supply and demand, and participates in the market as a trader in order to minimize price volatility. One embodiment of the present invention is a computer-implemented Hollywood Stock Exchange (HSX), which may be implemented as a simulation (i.e., game) or as an actual trading system for derivative financial instruments representing movies, talent, CDs, and television programs. These derivatives could be purchased with virtual currency known as Hollywood dollars (H$) which are controlled by a virtual reserve bank program.

In one representative embodiment of the present invention, the derivative financial instruments are identified by a Current Trading List displayed for the traders that comprises a list of movies in various stages of production, talent, and other entertainment-oriented assets. The list contains:

name of the derivative financial instrument;
genre of the movie (action-adventure, mystery, western, comedy, etc.);

production status (scripting, pre-production, filming, editing, release, home-video, etc.);
number of shares in circulation;
last trading price (printed every 15 minutes)
price movement (i.e. +/−H$) since the previous midnight (PST);
price movement since the previous mid-day;
price movement year to date;
Traders can view the list sorted by:
name, alphabetically;
genre, alphabetically;
productions status, alphabetically;
most active (number of shares traded yesterday);
biggest gainers;
biggest losers; and
fastest movers today (e.g., fastest 20 movers up and fastest 20 movers down).

Similar information would be provided for other derivative financial instruments offered on the Hollywood Stock Exchange.

Each trader's portfolio is identified by a Portfolio data structure that comprises the trader's account status. This information includes:
the amount of cash in the trader's account (paid interest at the system discount rate plus some increment, compounded daily);
current percentage rate paid on cash balances;
the total value of held stocks at the last selling price;
the total value of held bonds at the last selling price;
total portfolio value (TPV) (cash+bonds+stocks);
percentage of TPV in cash;
percentage of TPV in bonds; and
percentage of TPV in stocks.

Traders can generate any number of different reports for display, including:
lists of stocks and bonds being traded (see above);
index of total Hollywood stocks (HSXI) expressed as a number, with 1000 defined as the aggregate total stock price value on opening day, wherein HSXI=(today's gross stock-value)/(opening day gross stock-value);
index of total Hollywood bonds (HBXI) expressed as a number, with 1000 defined as the aggregate total bond price value on opening day, wherein HBXI=((today's gross bond-value)/(opening day gross bond-value));
index of total Hollywood Stock Exchange (HMXI) comprised of all stocks and bonds, and expressed as a number, with 1000 as the aggregate total stock price value on opening, wherein HMXI=((today's gross market-value)/(opening day gross market-value));
lists of the top market performers, e.g., the top 10 traders in percentage portfolio growth calculated as net portfolio value−change=(% change of cash)+(% change of stocks)+(% change of bonds), and for each of the categories: yesterday (midnight to midnight), last week (7 days, ending midnight, each Thursday), last month (closes at midnight last calendar day of month), last quarter (closes at midnight on last day of last month/quarter), year-to-date (running daily total of percentage value changes)/(days for year-to-date), and annually (closes at midnight on December 31 each year);
overall market condition report, including a list of stopped issues with:
name;
last trading price;
time that stop-trade condition occurred;
percentage the issue actually moved on-the-day before the stop-trade;
number of total shares and/or bonds traded today;
dollar value of total trades today;
number of buy and sell trades today; and
number of buy and sell trades this month.

Use of the above information guides traders in making future buy and sell orders.

With reference to FIG. 1, a block diagram illustrates an exemplary hardware environment for one embodiment of the present invention. More particularly, a typical distributed computer system is illustrated, which uses the Internet 10 to connect client computers 12 executing for example, Web browsers, to server computers 14 executing a computer program embodying the present invention. A typical combination of resources may include client computers 12 that are personal computers or work stations connected via the Internet 10 to server computers 14 that are personal computers, work stations, minicomputers, or mainframes.

Generally, both the client computers 12 and the server computers 14 are comprised of one or more CPUs 16, various amounts of RAM storing computer programs 20 and other data, and other components typically found in computers. In addition, both the client computers 12 and the server computers 14 may include one or more monitors, and fixed or removable data storage devices 20 such as hard disk drives, floppy disk drives, and/or CD-ROM drives. Also, input devices, such as mouse pointing devices and keyboards, may be included.

Both the client computers 12 and the server computers 14 operate under the control of an operating system, such as Windows, Macintosh, UNIX, etc. Further, both the client computers 12 and the server computers 14 each execute one or more computer programs 18 under the control of their respective operating systems. The present invention is preferably implemented as one or more computer programs 18 executed by the server computer 14, although in alternative embodiments these computer programs 18 may also be executed on the client computer 12.

Generally, the computer programs 18 implementing the present invention are tangibly embodied in a computer-readable medium, e.g., one or more of the fixed and/or removable data storage devices 20 attached to the computer. Under control of the operating system, the computer programs 18 may be loaded from the data storage devices 20 into the RAM of the computer for subsequent execution by the CPU 16. The computer programs 18 comprise instructions which, when read and executed by the computer, causes the computer to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
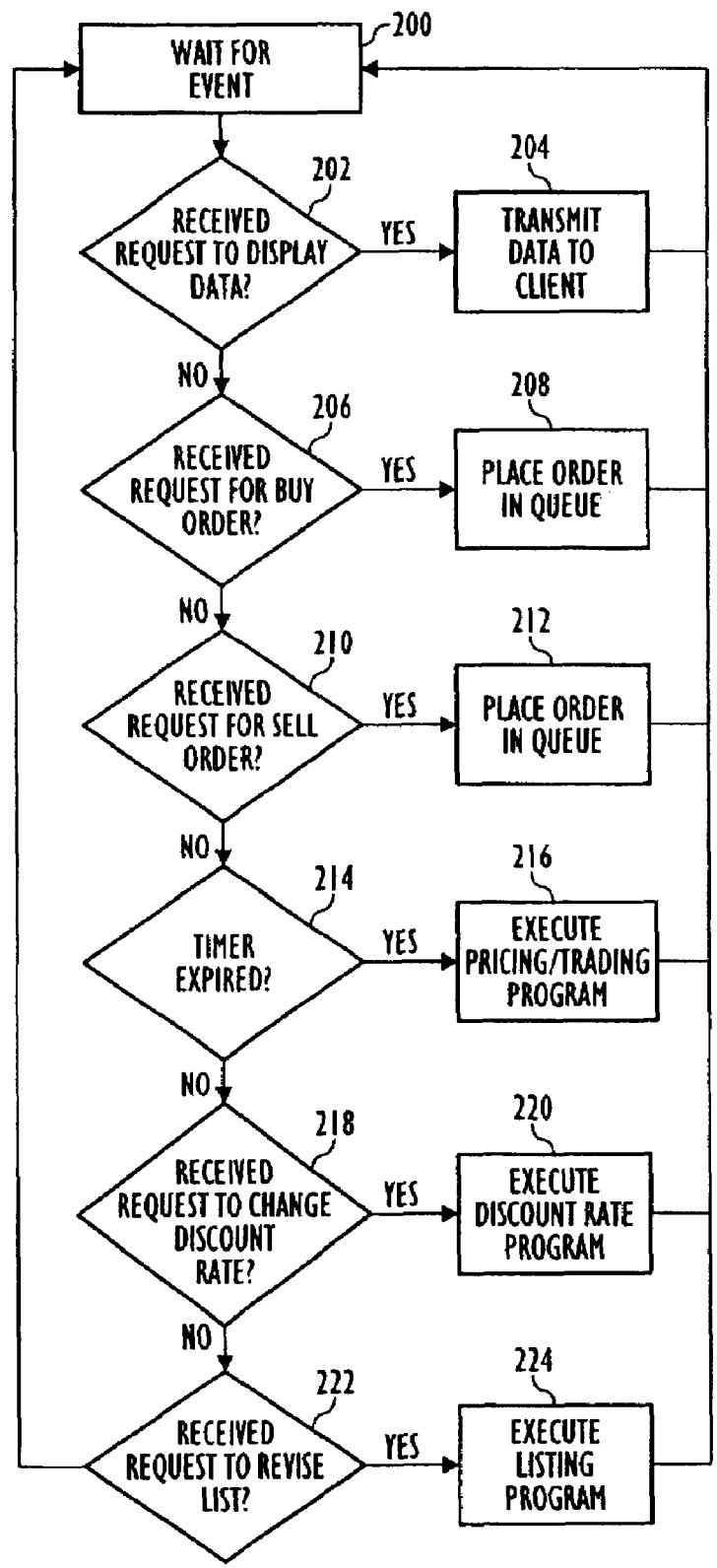
FIG. 2 shows a flowchart illustrating the general logic of a first embodiment of the present invention.

With reference to FIG. 2, a flowchart illustrates the general logic of one embodiment of the present invention. Block 200 represents the server computer 14 waiting for the next event to occur. Once the event occurs, control is transferred to blocks 202-224 to identify the event and respond accordingly.

Block 202 is a decision block that represents the server computer 14 determining whether it received a request to display data from the client computer 12. If so, block 204 represents the server computer 14 transmitting data to the client computer 12 for subsequent display. The data transmitted for display preferably includes at least three types of data: the current list of trading derivative financial instruments, the trader's portfolio, and other reports generated by the server computer 14.

Block 206 is a decision block that represents the server computer 14 determining whether it received a request to submit a buy order from the client computer 12 for a particular derivative financial instrument, e.g., stock or bond. If so, block 208 represents the server computer 14 processing the buy order by placing it in a queue in the memory of the server computer 14. The buy order is a data structure comprising:

- trader's account number;
- trader's name;
- the time and date of the order;
- the stock or bond to buy;
- the cash balance in the trader's account; and
- a text-field where the trader may enter the total number to buy (generally in multiples of 100).

In one embodiment of the present invention, the buy order waits in the queue for the expiration of a predetermined "sweep pricing cycle." The sweep pricing cycle occurs periodically, such as every 15 minutes, or during another specified time interval. The market price the trader actually pays for the derivative financial instrument is determined by the aggregate supply/demand for the derivative financial instrument at the end of the sweep pricing cycle during which the order was placed.

The market price is set by the pricing/trading program executed by the server computer, which is described below in FIG. 3. The trader's account is then charged the market price for the derivative financial instrument. If the purchase uses up all available cash in the trader's account, the trader is "loaned" enough money to pay for the purchase, and their account is charged interest at a predetermined rate, e.g., 18% a year compounded daily, on the negative account balance. The interest is charged against the trader's account until they accumulate more cash to zero out the balance, either by selling stocks or buying dollars.

Block 210 is a decision block that represents the server computer 14 determining whether it received a request to submit a sell order from the client computer 12. If so, block 212 represents the server computer 14 processing the sell order by placing it in queue in the memory of the server computer 14. The sell order is a data structure comprising:

- trader's account number;
- trader's name;
- the time and date of the order;
- the stock or bond to sell;
- the amount of the stock or bond in the trader's account; and
- a text-field where the trader may enter the total number to sell (generally in multiples of 100).

Like the buy order, the sell order waits in the queue for the expiration of the predetermined sweep pricing cycle. The market price at which the trader actually sells the derivative financial instrument is determined by the aggregate supply/demand for the derivative financial instrument at the end of the sweep pricing cycle during which the order was placed. The market price is set by the pricing/trading program executed by the server computer, which is described below in FIG. 3. The trader's account is then credited with the market price for the derivative financial instrument.

The sell order can be either produced by a trader or generated by the server computer 14, as will be explained in more detail below. For a sell order produced by a trader, he views his list of stocks or bonds on a monitor attached to the client computer and chooses to sell a quantity at the market price.

When the trader requests to view the list of stocks, the server computer 14 transmits certain information to the client computer 12 for display, including, for each stock owned, the last trading price (LTP), the quantity of stocks, the purchase price, and the date purchased, Similarly, when viewing the list of bonds, the server computer 14 transmits certain information to the client computer 12 for display, including, for each bond owned, the last trading price (LTP), the interest rate being earned for each kind of bond, the quantity of bonds, the purchase price, and the date purchased.

Block 214 is a decision block that represents the server computer 14 determining whether an internal timer for the sweep pricing cycle has expired. If so, block 216 represents the server computer 14 executing a pricing/trading program as described in FIG. 3.

Block 218 is a decision block that represents the server computer 14 determining whether it received a request to change the discount rate. If so, block 220 represents the server computer 14 executing a discount rate program. In order to add or subtract liquidity, the server computer 14 occasionally steps in to act as a virtual reserve bank program and adjust the discount rate. The discount rate is adjusted based on the performance of the specific industry of the market. For the Hollywood Stock Exchange, the discount rate is adjusted to add or subtract liquidity to affect the growth of the entertainment industry. When the server computer 14 lowers the discount, all the bonds seem to be a better deal, because the bonds are paying a fixed rate interest that never changes. This encourages traders to buy more bonds, and such surge in buying demand causes a correlated increase in bond prices as described above. The same thing happens to stocks, because traders are making less money on the interest being paid on the cash balance in their trading account. When the server computer 14 raises the discount rate, the bonds seem to be a worse deal, since their advantage over the discount is smaller. Thus, the server computer 14 relaxes the buying pressures or demands for bonds, which should result in additional sell orders, or at least slow the buying of bonds, thus decreasing their prices as they trade in the market. Likewise, stocks seem less attractive, since traders could make more money by keeping cash in their accounts and getting interest on it.

Block 222 is a decision block that represents the server computer 14 determining whether it received a request to revise the derivative list. If so, block 224 represents the server computer 14 executing a listing program. The server computer 14 determines whether the list of derivatives trading in the system should be revised. The list could be revised to reflect new derivative offerings, expired derivatives, and delisted derivatives.

When a new derivative is offered, the price is based on the derivative's potential value. For example, for a new stock offering, which represents a movie on the Hollywood Stock Exchange, the initial price of the stock could be based on the movie's potential box office revenue. For a bond offering, which represents talent on the Hollywood Bond Exchange, the price of the bond could be based on the Hollywood Reporter's Star Power Index. A bond representing a talent with a low Star Power Index of 15 would be issued with a higher yield than a bond representing a talent with a high Star Power Index rating.

A warrant with a strike price is attached to the new derivative when it is offered. When the derivative and warrant are first issued, the warrant is of no value until the strike price is reached. For a stock, the strike price could be reached after the movie has grossed a certain level of revenue. When a derivative is delisted from the exchange, a stock due to the movie ending its production run or a talent due to retirement or death, for example, the warrants are called and the traders are paid the value of the warrants, thus providing off-balance sheet financing for studios.

With reference to FIG. 3, a flowchart illustrating the logic of the pricing/trading program of the present invention is shown. Block 300 represents the server computer 14 retrieving the buy and sell orders that have accumulated in the queue during the period since the prior sweep pricing cycle. Block 302 represents the server computer 14 matching the buy orders with the sell orders, although it is likely than an identical number of buy and sell orders would not have accumulated in the queue during the period. Block 304 represents the server computer 14 executing the generate market price program described in FIG. 4 to determine the market price for the derivative financial instruments. After the market price is determined, block 306 represents the server computer 14 updating the traders' portfolios to reflect the buy and sell orders in the queue being processed at the market price. Block 308 represents the end of the pricing/trading program.

With reference to FIG. 4, a flowchart illustrating the logic of the generate market price program of the present invention is shown. One purpose of the generate market price logic is to generate a market price for a derivative financial instrument that reflects the demand or lack of demand for the derivative financial instrument in the market. Block 400 represents the server computer 14 measuring the imbalance between the buy and sell orders during the period since the prior sweep pricing cycle. Block 402 represents the server computer 14 determining the price movement of a derivative financial instrument caused by the imbalance in buy and sell orders. Block 404 represents the server computer 14 executing a virtual specialist program as described in FIG. 5 to provide stability and liquidity to the market. Block 406 represents the server computer 14 executing the stop trade program, as described in FIG. 6, to stop trading in a derivative financial instrument if the projected price movement is excessive during the trading day and threatens the integrity of the market for that instrument. Block 408 represents the server computer 14 setting the market price, which becomes the price the pricing/trading program uses to update the traders' portfolios. Block 410 represents the end of the generate market price program.

In measuring the imbalance between buy and sell orders, as represented by block 400, the absolute difference between the number of sells and the number of buys is defined as the net movement in sweep (NMS). A sweep increment variable (SIV) is defined as the increase or decrease in price caused by an incremental imbalance in the number of buy orders and sell orders. A lot movement variable (LMV) represents the incremental lot size that will result in a price increase or decrease of one SIV. The projected price movement (PM) can be expressed as: PM=(NMS/LMV)*SIV.

For example, with 42,000 buy orders and 30,000 sell orders for a particular stock, the NMS=(42,000−30,000)=12,000. With SIV=$0.25 and LMV=5000, the price movement of the particular stock will be (12,000/5,000)*0.25=$0.50. Thus, the market price of the particular stock will be $0.50 greater than the last trading price.

With such pricing scheme, there is the potential for great volatility in the price of a derivative financial instrument and the eventual loss of investor confidence in the market mechanism. In exchanges such as the Hollywood Stock Exchange, it would be possible for one or more individuals to pursue trading strategies that would purposely cause drastic price fluctuations.

In order to encourage growth and stability in the capital market regulated by the trading system of the present invention, a virtual specialist program is executed by the server computer, as represented by block 404 in FIG. 4. In executing the virtual specialist program, the server computer 14 regulates the trading by actively trading in the market out of a virtual specialist portfolio (VSP). In one embodiment of the present invention, the virtual specialist program portfolio initially contains half of all the issued shares of each derivative financial instrument.

Figure 5:
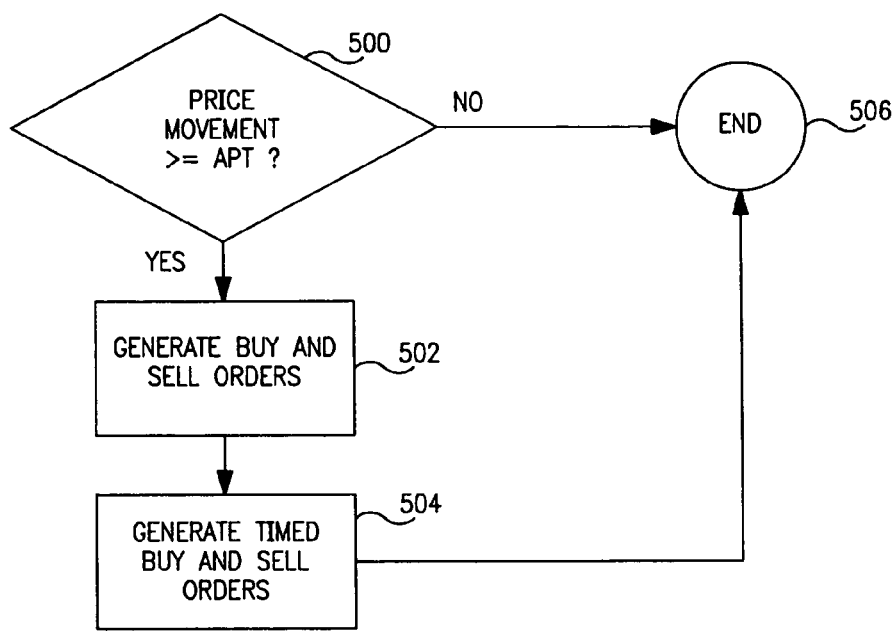
FIG. 5 shows a flow diagram illustrating the logic of the virtual specialist program of the first embodiment of the present invention.

With reference to FIG. 5, a flow diagram illustrating the logic of the virtual specialist program of the present invention is shown. Block 500 is a decision block that represents the server computer 14 determining whether the price movement during the sweep pricing cycle is greater or equal to an adjusted price movement threshold (APT). The APT is a constant in the memory of the server computer 14. If the APT is greater than the price movement, then the server computer 14 does not trade in the market. If the price movement is greater than or equal to the APT, then the server computer 14 trades out of a virtual specialist program portfolio. The level of trading by the server computer 14 is determined by the amount that the price movement exceeded the APT. The greater the price movement, the more shares the server computer 14 trades to offset the price movement.

In an exemplary embodiment of the present invention, the ATP=1.25 and the server computer 14 performs the following steps: if PM=APT then the server computer 14 matches 10% of unmatched shares; if PM=APT+0.25 then the server computer 14 matches 20% of unmatched shares; if PM=APT+0.50 then the server computer 14 matches 30% of unmatched shares; if PM=APT+0.75 then the server computer 14 matches 40% of unmatched shares; if PM=APT+1.0 then the server computer 14 matches 50% of unmatched shares; if PM=APT+1.25 then the server computer 14 matches 60% of unmatched shares; if PM=APT+1.50 then the server computer 14 matches 70% of unmatched shares; if PM=APT+1.75 then the server computer 14 matches 80% of unmatched shares.

Block 502 represents the server computer 14 generating a buy or a sell order to offset the price movement. The buy or sell order generated by the server computer 14 is placed in the queue with the trader buy and sell orders to be processed during the next sweep cycle.

In one embodiment of the present invention, since the virtual specialist program portfolio initially includes half of all the securities traded, the server computer 14 could eventually deplete the virtual specialist program portfolio or cause the virtual specialist program portfolio to own all the shares of a stock. In order to maintain a balanced virtual specialist program portfolio, and provide some liquidity to the market, the server computer 14 generates additional buy and sell orders to offset orders generated in response to the price movement exceeding the APT. Block 504 represents the server computer 14 generating timed buy and sell orders. In one embodiment of the invention, the server computer 14 assesses each stock and each bond in the virtual specialist program portfolio. The server computer 14 determines the deficit or surplus in the item, and then places $1/288^{th}$ of the deficit as a "timed recovery order" into each successive 15 minute segment for the next 3 days. When the pricing/trading program 255 matches buy and sell orders as represented by block 320, the pricing/trading program 255 includes any "timed recovery orders" outstanding for the last 3 days in the sweep. These orders are matched with the traders' buy and sell orders. Block 506 represents the end of the virtual specialist program.

Figure 6:
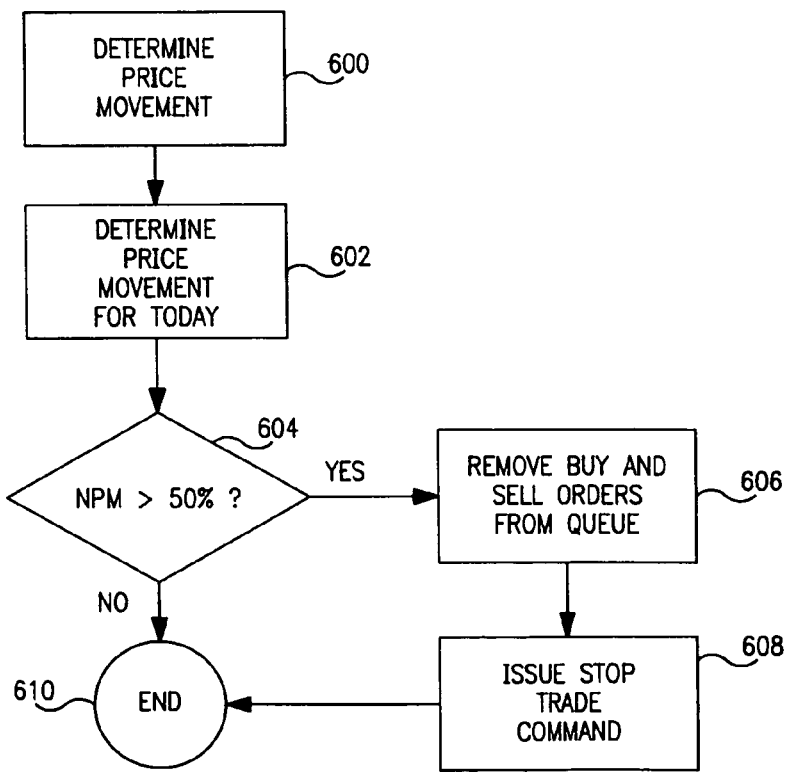
FIG. 6 shows a flow diagram illustrating the logic of the stop trading program of the first embodiment of the present invention.

FIG. 6 is a flow diagram illustrating the logic of the stop trading program of the present invention. Block 600 represents the server computer 14 determining the price movement of a stock caused by the imbalance in buy and sell orders. Block 602 represents the server computer 14 measuring the price movement on the day, not just during the sweep cycle period. Block 604 is a decision block that represents the server computer 14 determining whether the net price movement (NPM) within one "trading day" (i.e., midnight-midnight) is greater than 50% up or down. As represented by block 606, the buy and sell orders are removed from the queue if the net price movement is greater than 50% for a stock trading above $20. At that point, the trading in that issue is stopped within the 15 minute period until further notice. All orders (buy and sell) for that stock during this sweep are unfilled. The trading has stopped due to "excessive order imbalance".

For example, let it be assumed that the Last Trading Price (LTP) for "Rambo-17" is $67 (+7.5 on-the-day). During one 15-minute sweep pricing cycle, the server computer 24 receives buy orders for 655,000 shares of "Rambo-17". In addition, the server computer 14 receives sell orders for 35,000 shares of "Rambo-17" during the same sweep pricing cycle. The server computer 14 evaluates the price movement for the sweep pricing cycle, and tests it to see if the net projected price movement "on-the-day" is greater than 50%. If it would be greater than 50%, it stops trading in that instrument only. In this example, there is a net order-imbalance of 620,000 shares, which would create an up movement in price of (+620,000/5000)*$0.25=+$31.00. Since the total movement on the day would be the $7.50 so far plus the additional $31.00, the net projected price movement on the day would be $31.00+$7.50=$38.50. If the opening price that day was $59.50, the percentage projected price movement for the day is $38.50/$59.50=64%. Since the projected net price movement would be greater than 50%, the trading is stopped for that instrument. If the projected price movement was less than 50%, the price of the instrument would be adjusted accordingly and trade in that stock continued. Block 608 represents the STOP TRADE order that issues regarding the particular stock. Traders who issued a buy or sell order for the stock are notified that the order has not been filled due to excessive order imbalance during the trading day. Finally, block 610 represents the end of the stop trading program.

As mentioned above, according to the present invention derivative securities are traded in electronic or virtual currency known as Hollywood dollars (H$) on the exchange. When a customer opens an account with HSX, Inc. by logging on the HSX web site and registering his information, he is given an initial amount of virtual currency to trade on Hollywood Stock Exchange. For example, the initial trading portfolio may include cash in the amount of H$2 Million for the registered HSX account holders. The issuance of money to the newly registered HSX account holders is controlled by the virtual reserve bank program. By trading in derivative securities (stock, bonds, options, etc.), the HSX account holder either increases or decreases the total value of his portfolio measured in Hollywood dollars and comprised of various securities (debt and equity) and cash (money market funds). Of course, trading on margin results in negative amounts debited to his portfolio, and any proceeds from selling activities are swept into the money market fund to add to the cash portion.

Figure 7:
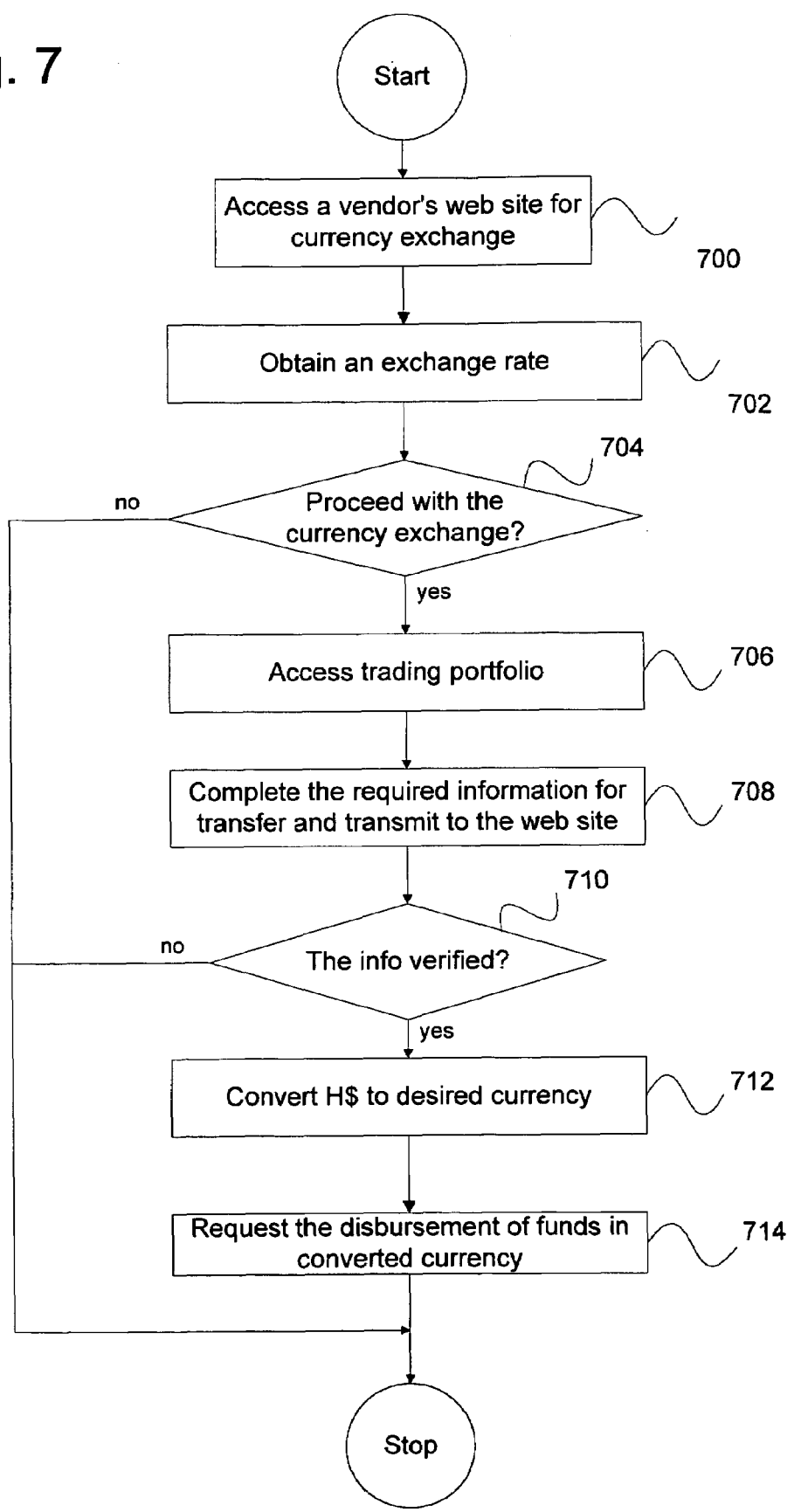
FIG. 7 shows a flowchart for using virtual currency in e-commerce in accordance with one embodiment of the present invention.

After successfully trading on the exchange, the HSX account holder may significantly increase the value of his portfolio. The HSX account holder may sell some or all of the securities and accumulate vast amount of Hollywood dollars. Alternatively, the HSX account holder's cash portion of the portfolio may be quite large by itself, without the need to sell his securities. In accordance with one aspect of the present invention and as shown in block 700 of FIG. 7, the HSX account holder may access a vendor's web site for currency exchange to convert the cash portion of his portfolio to "real" currency. The HSX account holder logs onto the web site dealing in currency exchange and requests the conversion rate for Hollywood dollars. In block 702 the HSX account holder obtains the exchange rate and decides, in block 704, whether to proceed with the transaction by exchanging his accumulated virtual currency (H$) for a desired type of "real" currency, such as U.S. Dollars, Euros, Yens, Rubles, etc. If he decides to exchange his Hollywood dollars for U.S. dollars, for example, the HSX account holder accesses his trading portfolio with HSX, Inc. over secure Internet communications link in block 706. In block 708 the HSX account holder is presented a menu using a graphical user interface for facilitating the transfer from his account to the currency exchange web site. The HSX account holder then completes the required fields in the menu and sends this information to the currency exchange web site along with the authorization to verify the HSX account holder's identity and availability of funds in his account.

The operator of the currency exchange web site verifies, via a secure communication session, the information provided by the HSX account holder. If the information is accurate as decided in block 710, the HSX account holder's Hollywood dollars are converted to the requested "real" currency in block 712. And in block 714, the HSX account holder requests that the funds be delivered in the requested "real" currency by mail, courier, etc.

Although "real" currency hereinabove refers to the tangible representation of money, the Internet dominance and its accompanying e-commerce may blur the boundaries between virtual and "real" monetary systems. Due to the information overload resulting from the global networking, people's attention and time becomes valuable commodity. Thus, as the currency exchange web site receives the people's attention and increased traffic flow in return for the "real" currency, this "monetization" of time may be more valuable than the "real" money. The currency exchange web site may carry goods and/or services, advertisements, etc. for other vendors, and by attracting people to the web site because of the currency exchange, significant financial benefits may be obtained by the vendor using this strategy of paying small sums for people's attention and time.

Figure 8:
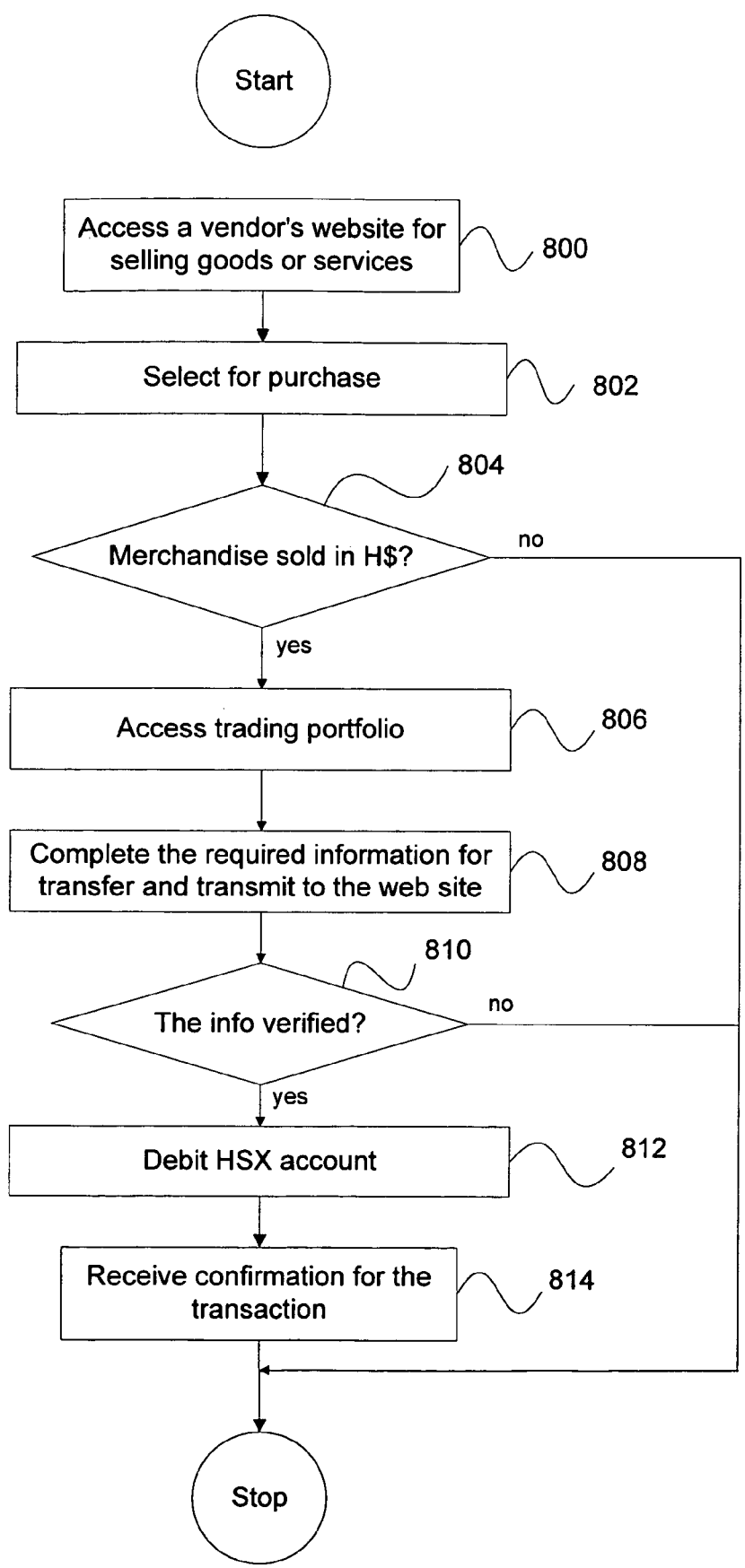
FIG. 8 shows a flowchart for using the virtual currency in e-commerce in accordance with another embodiment of the present invention.

FIG. 8 shows a flowchart for using the virtual currency in e-commerce in accordance with another embodiment of the present invention. In block 800, an HSX account holder accesses a vendor's web site for selling goods and/or services that may be desired by the HSX account holder. In block 802, the HSX account holder selects the desired product and/or service on the vendor's web site. If the desired product and/or service is sold in the virtual currency (H$), as decided in block 804, then the HSX account holder accesses his trading portfolio with HSX, Inc. over secure Internet communications link in block 806. In block 808, the HSX account holder is presented a menu using a graphical user interface for facilitating the transfer from his account to the currency exchange web site, as explained above. The HSX account holder then completes the required fields in the menu and sends this information to the vendor's web site along with the authorization to verify the HSX account holder's identity and availability of funds in the account.

The vendor then verifies, via a secure communication session, the information provided by the HSX account holder. If the information is accurate as determined in block 810, the cost of the desired product and/or service is debited to the HSX account or, alternatively, is transferred to the vendor's web site in block 812. And in block 814, the HSX account holder receives an electronic confirmation of the transaction.

Figure 9:
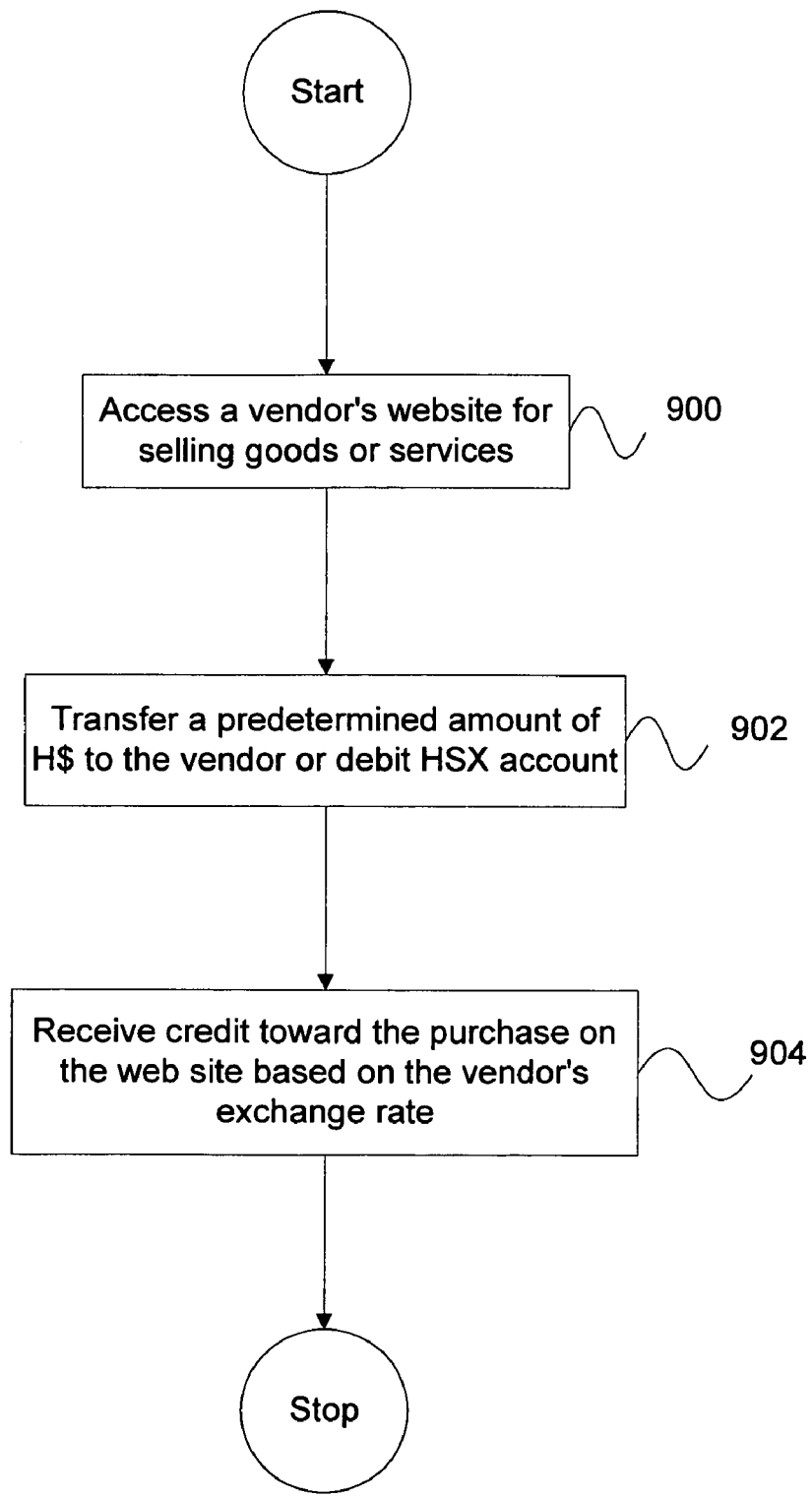
FIG. 9 shows a flowchart for using the virtual currency in e-commerce in accordance with yet another embodiment of the present invention.

FIG. 9 shows a flowchart for using the virtual currency in e-commerce in accordance with yet another embodiment of the present invention. In block 900, an HSX account holder accesses a vendor's web site for selling goods and/or services. In block 902, a predetermined amount of H$ is transferred by the HSX account holder to the vendor's web site via secure communications lines as described above with reference to FIGS. 7 and 8. Alternatively, the HSX account may be debited for that predetermined amount in response to the request from the HSX account holder. In return, the vendor issues a credit to the HSX account holder toward the purchase of goods and/or services on the vendor's web site in block 904. The amount of credit is based on the exchange rate established by the vendor.

Figure 10:
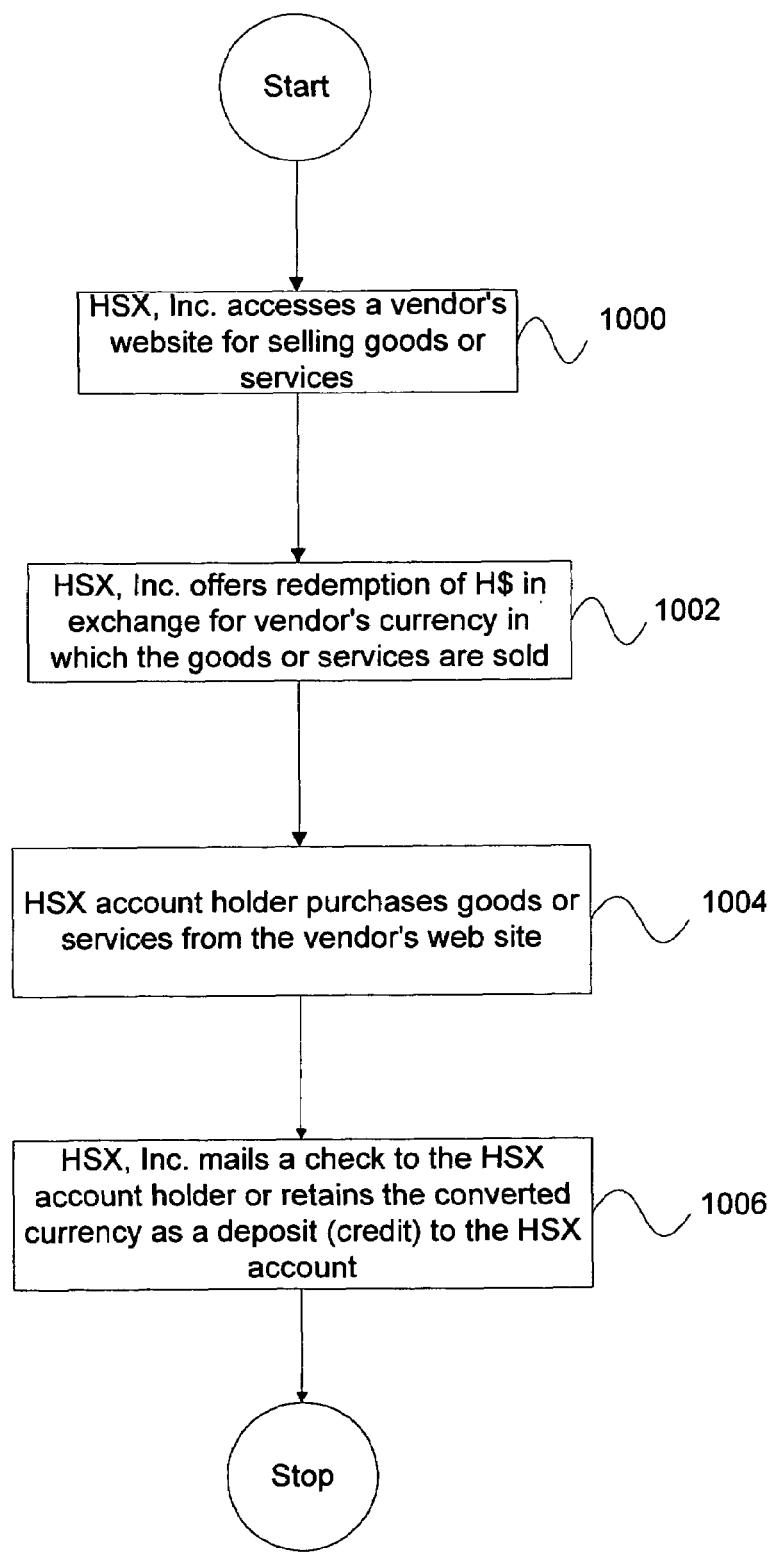
FIG. 10 shows a flowchart for using the virtual currency in e-commerce in accordance with still another embodiment of the present invention.

In still another embodiment of the present invention, FIG. 10 shows a flowchart for using the virtual currency in the HSX account in e-commerce. In block 1000, an official representative of HSX, Inc. logs on the Web to access a vendor's site for selling goods and/or services. In block 1002, the HSX, Inc. representative offers the virtual currency in H$ for redemption by the vendor. In return, HSX, Inc. receives "real" currency at the exchange rate provided by the vendor at his web site. In block 1004, an HSX account holder is informed of a promotion run by the vendor through the vendor's web site. The HSX account holder may then visit the vendor's web site to purchase goods and/or services on-line in block 1006. In that case, HSX, Inc. mails a check to the HSX account holder in a predetermined amount. The check is in "real" currency and is a portion of the virtual currency exchange between HSX, Inc. and the vendor. Alternatively, the converted currency may be retained in the HSX holder's account as a deposit or credit towards future purchases on the Internet.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for trading a plurality of instruments in a computerized trading system that receives buy orders and sell orders for an instrument, the method comprising:

Measuring with at least one server computer an imbalance between the buy orders and sell orders for the instrument received over a given period, the buy and seller orders received from at least a first computer associated with a first trader and a second computer associated with a second trader, each of the first and second computers coupled to the at least one server computer over a communication network;

Computing with at least one server computer a projected price movement based on the measured imbalance between the number of buy and sell orders;

setting a market price for the instrument based upon the received buy and sell orders and the measured imbalance;

automatically generating additional buy orders or sell orders for the instrument at the market price to guarantee execution of some or all of the received buy or sell orders;

generating an electronic currency to execute the buy or sell orders;

crediting a first trader's account with proceeds in the electronic currency for the executed sell orders by the first trader; and debiting a second trader's account in the electronic currency for the executed buy orders by the second trader.

2. The method according to claim 1, further comprising exchanging the electronic currency in the first or second trader's account for desired currency.

3. The method according to claim 2, wherein the electronic currency is exchanged at a currency exchange web site, and wherein a request for the exchange is transmitted to the currency exchange web site via a secured communication.

4. The method according to claim 1, further comprising purchasing goods or services using the electronic currency in the first or second trader's account, the goods or services being offered for sale by an on-line vendor via a web site on the Internet.

5. The method according to claim 4, wherein a request for the purchase is transmitted to the vendor's web site via a secured communication.

6. The method according to claim 4, wherein the vendor debits the first or second trader's account in the electronic currency for the purchase of goods or services via a secured communication.

7. The method according to claim 1, wherein the additional buy orders or sell orders for the instrument are automatically generated at the market price if the projected price movement is greater than or equals a predetermined price movement threshold.

8. A computerized trading system for trading a plurality of instruments via buy orders and sell orders, comprising at least one server computer comprising program code that when executed causes the at least one server computer to perform a method comprising:

measuring an imbalance between the buy orders and sell orders for an instrument received over a given period, the buy and seller orders received from at least a first computer associated with a first trader and a second computer associated with a second trader, each of the first and second computers coupled to the at least one server computer over a communication network;

computing a projected price movement based on the measured imbalance between the number of buy and sell orders;

setting a market price for the instrument based upon the received buy and sell orders and the measured imbalance;

automatically generating additional buy orders or sell orders for the instrument at the market price to guarantee execution of some or all of the received buy or sell orders;

generating an electronic currency to execute the buy and sell orders; and crediting a first trader's account with proceeds in the electronic currency for the executed sell orders by the first trader and debiting a second trader's account in the electronic currency for the executed buy orders by the second trader.

9. The system according to claim 8, the program code causes the at least one server computer to perform the method that further comprises exchanging the electronic currency in the first or second trader's account for desired currency.

10. The system according to claim 8, the program code causes the at least one server computer to perform the method that further comprises purchasing goods or services using the electronic currency in the first or second trader's account, the goods or services being offered for sale by an on-line vendor via a web site on the Internet.

11. The system according to claim 8, wherein the additional buy orders or sell orders for the instrument are automatically generated at the market price if the projected price movement is greater than or equals a predetermined price movement threshold.

12. A computer-readable storage medium for storing program code, that when executed, causes at least one server computer to perform a method for trading a plurality of instruments in a computerized trading system that receives buy orders and sell orders for an instrument, the method comprising:

measuring an imbalance between the buy orders and sell orders for the instrument received over a given period, the buy and seller orders received from at least a first computer associated with a first trader and a second computer associated with a second trader, each of the first and second computers coupled to the at least one server computer over a communication network;

computing a projected price movement based on the measured imbalance between the number of buy and sell orders;

setting a market price for the instrument based upon the received buy and sell orders and the measured imbalance;

automatically generating additional buy orders or sell orders for the instrument at the market price to guarantee execution of some or all of the received buy or sell orders; generating an electronic currency to execute the buy or sell orders;

crediting a first trader's account with proceeds in the electronic currency for the executed sell orders by the first trader; and debiting a second trader's account in the electronic currency for the executed buy orders by the second trader.

13. The computer-readable storage medium according to claim 12, the method further comprising exchanging the electronic currency in the first or second trader's account for desired currency.

14. The computer-readable storage medium according to claim 12, the method further comprising purchasing goods or services using the electronic currency in the first or second trader's account, the goods or services being offered for sale by on-line vendor via a web site on the Internet.

15. The computer-readable storage medium according to claim 12, where in the additional buy orders or sell orders for the instrument are automatically generated at the market price if the projected price movement is greater than or equals a predetermined price movement threshold.

* * * * *